United States Patent
Holt et al.

(10) Patent No.: US 7,076,341 B2
(45) Date of Patent: Jul. 11, 2006

(54) AUTONOMOUS MANOEUVRING FOR SPINNING SPACECRAFT

(75) Inventors: Anthony P Holt, Stevenage (GB); Michele P Janvier, Toulouse (FR)

(73) Assignee: Astrium Limited, Hertfordshire (GB)

( * ) Notice: Subject to any disclaimer, the term of this patent is extended or adjusted under 35 U.S.C. 154(b) by 167 days.

(21) Appl. No.: 10/493,611

(22) PCT Filed: Oct. 8, 2002

(86) PCT No.: PCT/GB02/04550

§ 371 (c)(1),
(2), (4) Date: Apr. 23, 2004

(87) PCT Pub. No.: WO03/036404

PCT Pub. Date: May 1, 2003

(65) Prior Publication Data

US 2005/0027407 A1   Feb. 3, 2005

(30) Foreign Application Priority Data

Oct. 26, 2001   (GB)  ................................. 0125728.6

(51) Int. Cl.
*B64C 1/00*   (2006.01)
*G05D 1/08*   (2006.01)

(52) U.S. Cl. ................. 701/4; 701/3; 701/13; 701/226; 244/164; 244/170

(58) Field of Classification Search .................... 701/3, 701/4, 13, 226; 244/164, 170, 169
See application file for complete search history.

(56) References Cited

U.S. PATENT DOCUMENTS

| 3,437,288 | A |   | 4/1969 | Lam ........................... 528/275 |
| 4,657,210 | A |   | 4/1987 | Hubert et al. ............ 244/158.5 |
| 4,758,957 | A | * | 7/1988 | Hubert et al. .................. 701/13 |
| 4,927,101 | A |   | 5/1990 | Blancke ...................... 244/164 |
| 5,020,744 | A | * | 6/1991 | Schwarzschild ............. 244/164 |
| 5,411,227 | A |   | 5/1995 | Basuthakur et al. ......... 244/169 |
| 6,102,338 | A |   | 8/2000 | Sakashita et al. ........... 244/171 |
| 6,108,594 | A |   | 8/2000 | Didinsky et al. .............. 701/13 |
| 6,512,979 | B1 | * | 1/2003 | Needelman et al. ......... 701/222 |

FOREIGN PATENT DOCUMENTS

| EP | 0 090 914 A | 10/1983 |
| EP | 0 460 935 A | 12/1991 |
| EP | 0 796 787 | 9/1997 |
| EP | 0 861 784 | 9/1998 |

* cited by examiner

Primary Examiner—Gertrude A. Jeanglaude
(74) Attorney, Agent, or Firm—Nixon & Vanderhye P.C.

(57) ABSTRACT

An inventive autonomous active manoeuvring method and system 1 for spinning spacecraft is provided having a capability to enhance the AOCMS performance of passive spinning satellites and to fulfil the emerging autonomy requirements applicable to new generation satellites. In broad terms, the invention resides in (a) the overall concept of providing autonomous execution of spin axis re-orientation manoeuvring for spinning spacecraft designed and executed autonomously on-board the spacecraft by the AOCMS and (b) in the proposed strategy set in place to execute the re-orientation manoeuvres with respect to the handling of residual nutation. Advantageously, the provision of coupling nutation avoidance manoeuvres with active nutation damping 8 on board the spacecraft reduces/minimises the manoeuvre settling time required to return the spacecraft to the steady state pointing performance, while not imposing constraints upon the particular spacecraft inertia sensor properties.

11 Claims, 14 Drawing Sheets

| Inertia Radio | 1.2 | 1.25 | 1.29 | 1.3-1.35 | 1.36 | 1.4 | 1.5 |
|---|---|---|---|---|---|---|---|
| One thruster NAM | Optimum | Optimum | Optimum | W/C | Optimum | | |
| Two thruster NAM | | | | W/C | | Optimum | Optimum |
| Delta-H phase angle | 0° | 0° | 50° | 40°-50° | 50° | 0° | 0° |
| Residual nutation | 0' | 0' | 0' | <2' | 0' | 0' | 0' |

Fig.12.
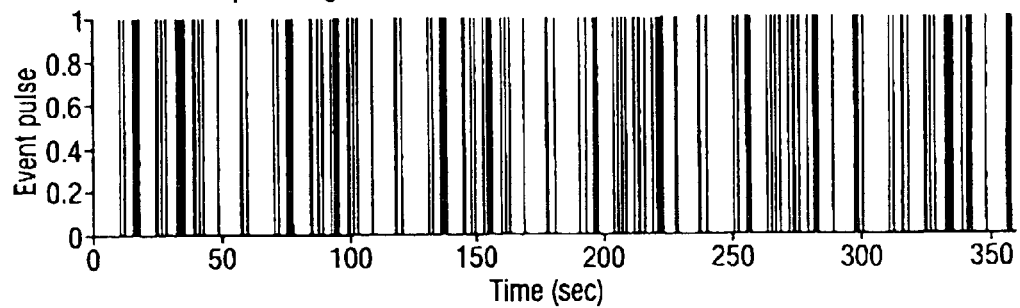

Fig.13.
Attitude determination Euler error angles. PDF in $($ $"$ $)^{-1}$
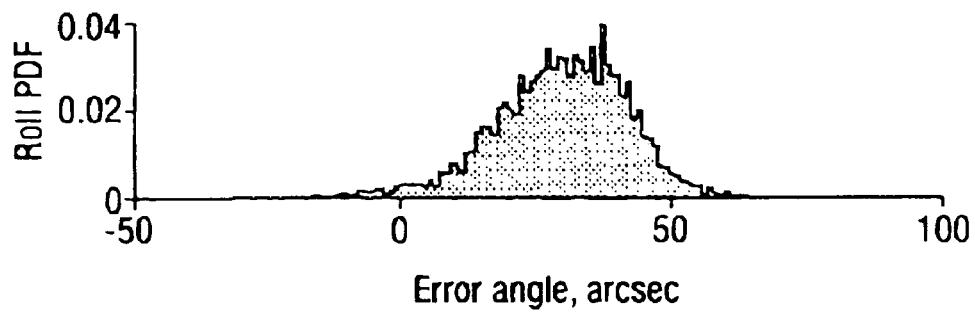
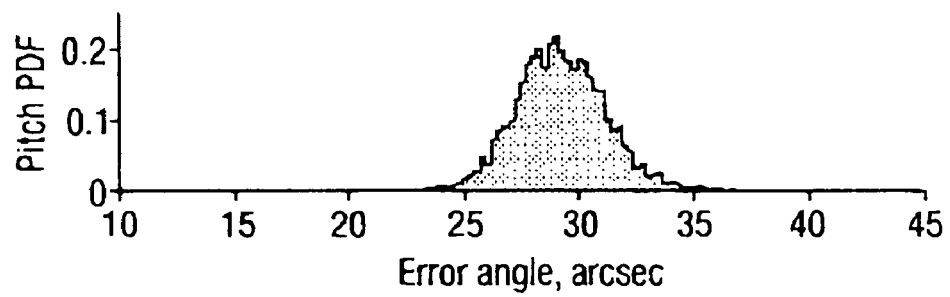
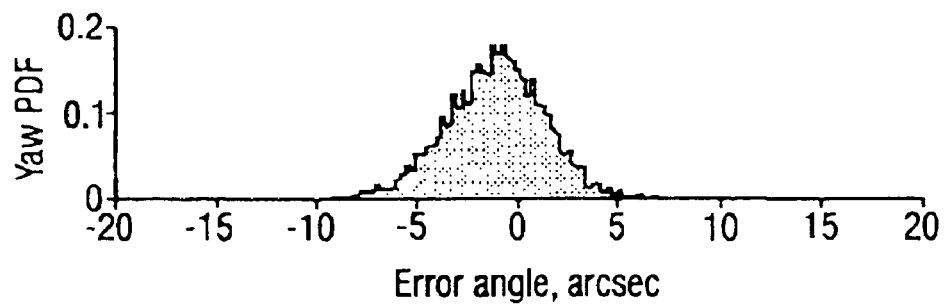

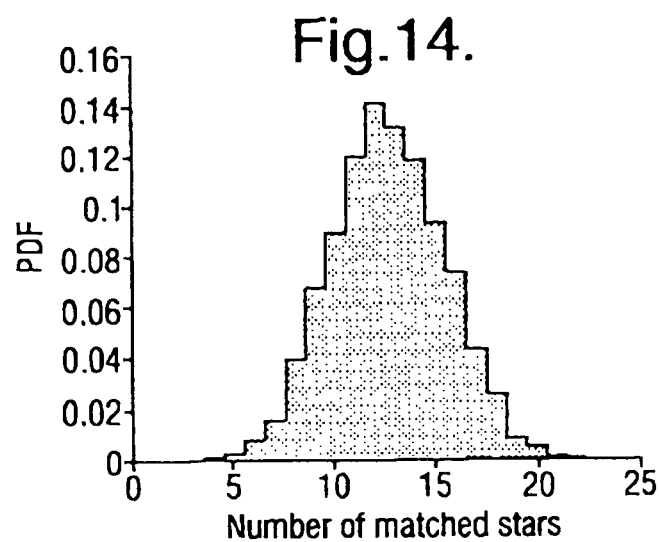
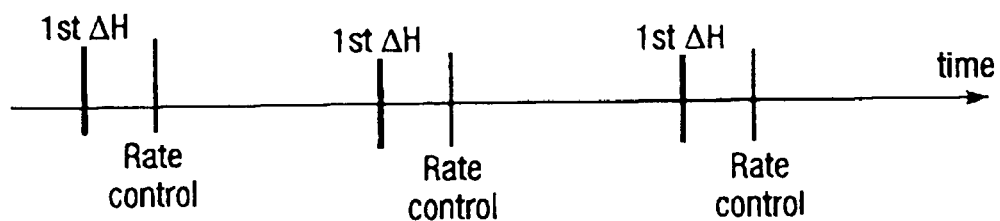

AUTONOMOUS MANOEUVRING FOR SPINNING SPACECRAFT

This application is the US national phase of international application PCT/GB02/04550, filed in English on 8 Oct. 2002, which designated the US. PCT/GB02/04550 claims priority to GB Application No. 0125728.6, filed 26 Oct. 2001. The entire contents of these applications are incorporated herein by reference.

FIELD OF THE INVENTION

The present invention relates to an autonomous active manoeuvring method and system for spinning spacecraft, and more particularly, but not exclusively, concerns a method and system of autonomous execution of spin axis re-orientation manoeuvres of spacecraft designed and executed autonomously on-board by AOCMS (that is, estimation guidance and on-board closed loop control).

BACKGROUND OF THE INVENTION

On conventional spinning spacecraft, such as for the Giotto and Cluster missions, the ground is entirely in charge of attitude determination and the design of momentum re-orientation manoeuvres: the ground performs the attitude reconstitution through measurements from a (non-autonomous) star mapper and computes the next manoeuvre to be executed in near real time. The manoeuvre is computed and executed "a priori", from the knowledge of the actual spin axis attitude, and the prescribed spin axis attitude. This is illustrated in FIG. 1.

This known approach reduces/minimises the on-board AOCMS software complexity, but at the expense of ground computations, and during non-contact periods, manoeuvre realisation errors accumulate. It also requires a specific solution to master the nutation generated by the momentum reorientation manoeuvres. In this connection, the following requirements are to be noted:

(1) No closed loop control is required on-board, allowing for a simpler AOCMS on-board; closing the loop is performed on-ground. No on-board autonomous attitude determination is therefore required, and no on-board closed loop computation and execution of manoeuvres is therefore required.

(2) Nutation Avoidance Manoeuvres strategies for momentum re-orientation manoeuvres are required to maximise the useful mission time (i.e. when the pointing stabilisation requirement is met).

In this known strategy, as illustrated in FIG. 2, the manoeuvre is split into two small pulses. Nutation is shown to be minimised by phasing the two pulses with respect to each other. The thrust angle is a function of the spin rate (to perform a thrust in the right direction with respect to the inertial frame), and of the nutation rate (to perform a thrust that "kills" the nutation of the first thrust in the body frame). The efficiency of the Nutation Avoidance Manoeuvre is directly given by the thrust angle. Some limitations are however inherent to this known strategy. For example, for some spacecraft inertial tensor properties, it is not possible to find both a thrust angle and a thrust phasing that null the nutation at the end of the spin axis re-orientation. This kind of open loop Nutation Avoidance Manoeuvre is inefficient for some unfavourable inertia ratios, as shown in FIG. 3, thus, and requires the inertial nutation period to be phased with the body nutation period. In case no phasing is available (within a short time, typically before two spin periods), there is an unwanted residual nutation at the end of the second manoeuvre.

(3) Residual nutation control is performed passively, using Passive Nutation Dampers. Note that a Passive Nutation Damper (PND) typically comprises a tube and end pots filled with fluid. Nutation creates cyclic acceleration along the tube and energy dissipation within the fluid makes the nutation decay, so motion tends to a pure spin around the principal inertia axis. PNDs are tuned on the nutation frequency. The tuning is achieved by appropriately designing their dimensions with respect to the dynamic characteristics of the spacecraft. The resulting PND time constant depends on the spacecraft geometry, on the spin rate and on the PND intrinsic characteristics.

In the framework of the new generation of mission, however, the increased autonomy requirements (aimed at reducing the operational costs) and the more complex spin momentum attitude requirements (aimed at providing sufficient manoeuvrability, as required by the mission sky or Earth coverage) do not make near real time operations using the above described known approach simple. To fulfil the requirements of the new generation missions, attitude determination has to be done on a typical 24 hours basis, and manoeuvres have to be computed and executed, "a priori", from the initial attitude determination solution for, typically, the coming 48 hours.

Further, error accumulation increases as momentum re-orientation manoeuvre realisation errors accumulate. As an example, when using thrusters, these are mainly linked to thruster impulse bit repeatability and sensitivity to initial actual thruster temperature. Error accumulation yields a pointing drift error of typically a few arc minutes per day, depending on the actual correlation between independent manoeuvres. Usage of a solution, as currently defined for former spinning satellites, can be detrimental to the required medium term pointing stability for the mission.

From the short term pointing stability point of view, it is desired to minimise the nutation generated by the momentum re-orientation manoeuvres, and also to minimise the subsequently required time to damp any residual nutation. Both items are needed in order to reach a "steady-state" pointing stability performance as soon as possible. This in turn maximises useful mission time. Tightly controlling the nutation principally through Nutation Avoidance Manoeuvres using known arrangements, however, can either cause constraints on the spacecraft mass properties, or require a strategy redesign if the mass properties evolve.

On the other hand, the usage of known Passive Nutation Dampers cause accommodation and validation issues for spinning spacecraft. This is particularly true when a short duration is available after spacecraft momentum repainting manoeuvres.

OBJECTS AND SUMMARY OF THE INVENTION

The present invention aims to overcome or at least substantially reduce some of the above-mentioned drawbacks.

It is an object of the present invention to provide an improved autonomous active manoeuvring method and system for spinning spacecraft with a capability to enhance the AOCMS performance of passive spinning satellites, and to fulfil the emerging autonomy requirements, as hereinabove discussed, applicable to new generation satellites.

It is another object of the present invention to alleviate the on-board/on-ground interface for spacecraft related to the execution of spin axis re-orientation manoeuvres, while reducing/minimising the duration for controlling the nutation generated by these manoeuvres. The following points are to be noted in this connection:

(1) The on-board/on-ground interface defined to achieve the on-board attitude restitution and manoeuvres stems from both the autonomy and the pointing requirements applicable to new generation spinning satellites. A definite improvement is proposed in the present invention, as compared to previous spinner missions, for the benefits of operation simplicity and pointing performance.

(2) Rather than relying exclusively on ground computations for attitude determination and for manoeuvre definition, autonomous attitude determination in the present invention is foreseen on board the spacecraft. Attitude knowledge on board advantageously allows the AOCMS to autonomously design the amplitude of the manoeuvres, with the additional objective of correcting execution errors from former manoeuvres.

(3) The evolutions in spacecraft definition and requirements, as well as the availability of new technologies (for instance, laser gyro), make Active Nutation Damping a preferred solution for control purposes in the present invention, as compared to the known usage of Passive Nutation Dampers. This is associated together with Nutation Avoidance Manoeuvres. Further, the proposed inventive strategy of the invention minimises/reduces the time required for the spacecraft to return to the steady state pointing performance, while not imposing constraints on spacecraft inertia tensor properties.

In broad terms, the present invention resides in (a) the overall concept of providing autonomous execution of spin axis re-orientation manoeuvres for spinning spacecraft designed and executed autonomously on-board the spacecraft by the AOCMS (i.e. estimation guidance and on-board closed-loop control), and (b) in the proposed strategy set in place to execute the re-orientation manoeuvres, with respect to the handling of residual nutation.

More particularly, the method/system of the present invention takes advantage of the following techniques, in combination, so as to achieve the desired technical effect, namely:

(a) computation of the magnitude and the phase of the initial thruster pulses such that the manoeuvring can be completed in a time less than or equal to half the inertial precession period;

(b) completion of the manoeuvring based on the time from the start of the manoeuvre and the angular rates on the spacecraft body as measured using gyroscopes; and (c) autonomous attitude determination between manoeuvres such that an error in a particular manoeuvre (due to thruster misalignments etc) can be corrected in subsequent manoeuvres.

Therefore, according to the present invention, there is provided an autonomous active manoeuvring method for performing autonomously, in closed loop on-board, a series of fine attitude manoeuvres for a spinning spacecraft, the method comprising:

(a) arranging a plurality of thrusters in a predetermined spatial configuration at the spacecraft;

(b) controllably generating a series of thruster pulses by means of the thrusters in said predetermined spatial configuration, the magnitude and the phase of the thruster pulses being determined by computation means so as to permit fine attitude reorientation manoeuvring of the spacecraft about its spin axis, the manoeuvring being effected in a time duration less than or equal to half the inertial precession period of the spacecraft about its spin axis;

(c) completing the manoeuvring in dependence upon the measured time from the start of the manoeuvre and the measured angular rates associated with the spacecraft nutation; and (d) providing an autonomous attitude determination of the spacecraft between successive manoeuvring steps such that, in operation of the spacecraft, the errors associated with particular manoeuvres can be controllably corrected in subsequent manoeuvres.

In accordance with an exemplary embodiment of the invention which will be described hereinafter in detail, active nutation damping (AND) is performed under AOCMS control by enabling rate controller means on-board the spacecraft, the nutation being sensed by a (dedicated) sensor and damped through (dedicated) control and (dedicated) actuator means. As already mentioned, coupling nutation avoidance manoeuvres with active nutation damping reduce/minimise the manoeuvre settling time required to return the spacecraft to the steady state pointing performance, while not imposing constraints upon the particular spacecraft inertia sensor properties.

Advantageously, the series of thruster pulses are time-phased in a manner which takes account of variations in the measured angular rates associated with the spacecraft nutation, thereby enabling the measured angular rates to be actively controlled.

Advantageously, the measured angular body rates are measured to high accuracy by gyroscopic means and the generated thruster torques can be applied on two predetermined transverse axes of the spacecraft, these axes being defined as orthogonal to the spin axis of the spacecraft.

The attitude estimation on-board the spacecraft can be conveniently performed through an autonomous star tracker, or alternatively, by using a non-autonomous attitude sensor, a V-sight star mapper for example.

The present invention further extends to a spacecraft system adapted and arranged to carry out the above described method comprising:

a plurality of thrusters arranged in a predetermined spatial configuration at the spacecraft, the thrusters being operable to generate controllably a series of thruster pulses;

means for determining the magnitude and the phase of the thruster pulses so as to permit fine attitude reorientation manoeuvring of the spacecraft about its spin axis, the manoeuvring being effected in a time duration less than or equal to half the inertial precession period of the spacecraft about its spin axis;

means for completing the manoeuvring in dependence upon the measured time from the start of the manoeuvre and the measured angular rates associated with the spacecraft nutation; and means for providing an autonomous attitude determination of the spacecraft between successive manoeuvring steps such that, in operation of the spacecraft, the errors associated with particular manoeuvres can be controllably corrected in subsequent manoeuvres.

The present invention can conveniently be embodied in software.

The above and further features of the invention are set forth with particularity in the appended claims and will be described hereinafter with reference to the accompanying drawings.

BRIEF DESCRIPTION OF THE DRAWINGS

FIG. 12 shows a typical star mapper output using the arrangement of FIG. 6;

FIGS. 13 and 14 show example Monte Carlo results for use in the invention;

FIGS. 15 and 16 show typical sequences of manoeuvres for use in the invention.

DETAILED DESCRIPTION OF EXEMPLARY EMBODIMENTS

In this specification, the term "autonomous" is taken to mean without ground intervention other than initialisation from ground. Also, the term "attitude" is used throughout to mean/cover any orientation with respect to a predetermined reference frame. Also, the terms "magnitude" and "phase" as used in relation to thruster pulses should be taken to mean duration of the pulses and the time when the pulses are to be fired.

Figure 1:
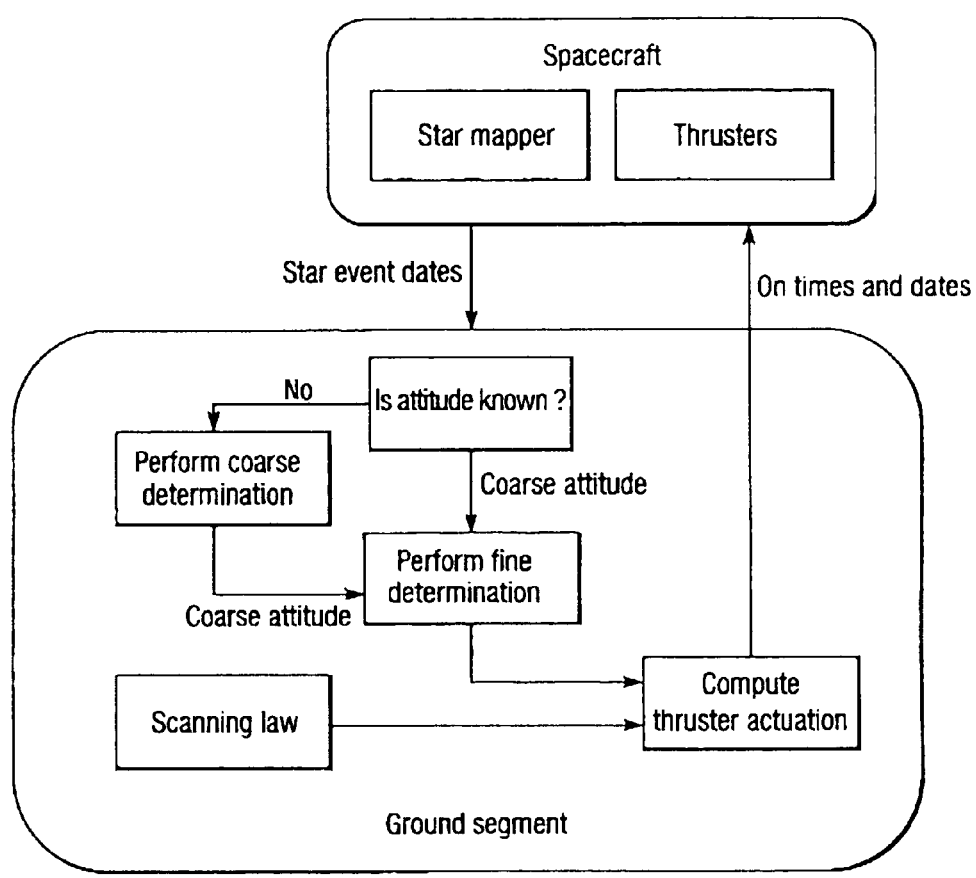
FIG. 1 is a schematic of a known cluster on-ground/on-board task sharing arrangement for attitude determination/reorientation manoeuvres of spacecraft.
Figures 2, 3:
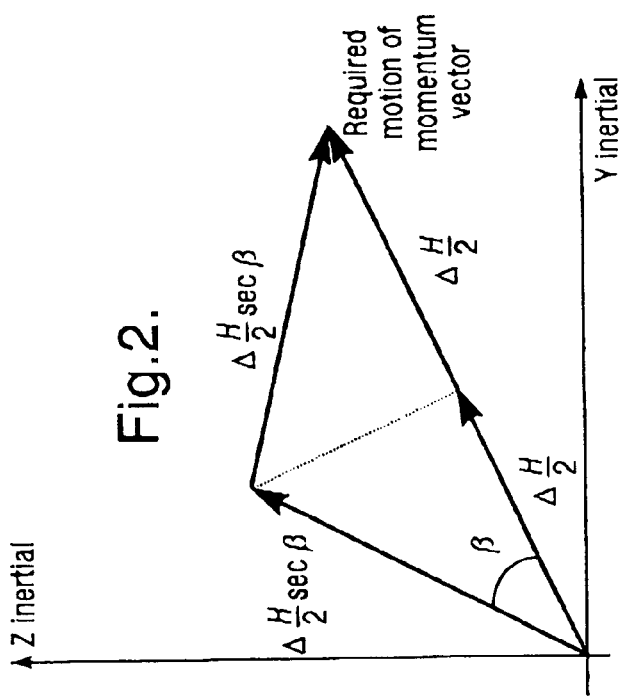
FIG. 2 is a diagram for a conventional open loop nutation avoidance manoeuvre for spacecraft.
FIG. 3 is a table showing typical inertia ratios for a conventional open loop nutation avoidance manoeuvre for spacecraft.
Figure 4:
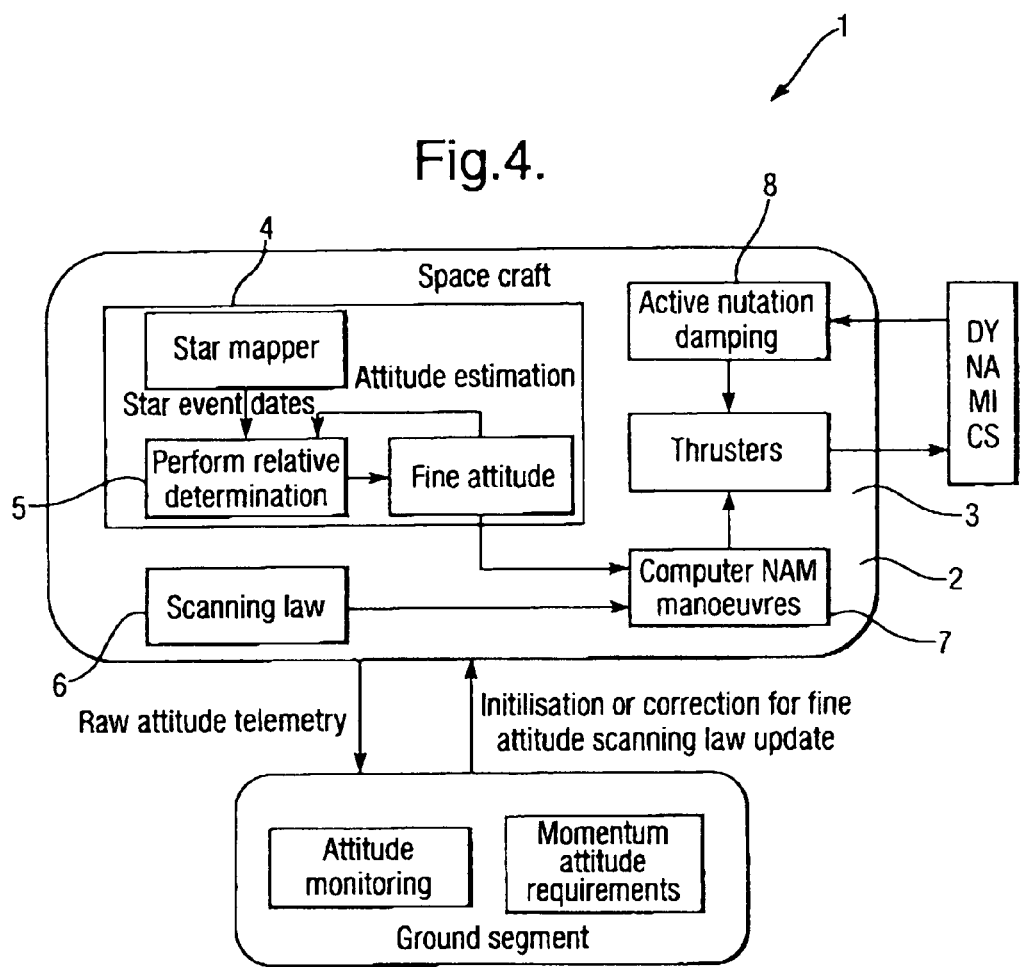
FIG. 4 is a schematic of an arrangement embodying the present invention.

Referring first to FIG. 4, there is schematically shown therein a preferred spacecraft system 1 adapted and arranged to carry out the closed loop nutation avoidance manoeuvre (NAM) of the present invention. More particularly, as shown, the spacecraft system 1 comprises an on-board segment 2 which includes a plurality of thrusters 3 arranged in a predetermined spatial configuration (not shown) at the spacecraft, a star mapper component 4, means 5 for performing attitude determination on-board in closed loop, scanning law algorithm means 6, computation means 7 for computing the NAM manoeuvres and executing the manoeuvres closed loop to target the required spacecraft angular momentum orientation in inertial space and active nutation damping means 8 for providing closed loop nutation control at the end of the (NAM) manoeuvres. As shown in the Figure, the on-board segment 2 is further arranged to co-operate with a remote ground segment 10 by telemetry. The ground segment 10 comprises means for attitude monitoring 11 and means for providing attitude information 12, for example momentum attitude information requirements. The on-board segment 2 is coupled to the dynamics part 15 of the spacecraft.

In operation of the spacecraft system 1, therefore, the star mapper 4 transmits raw data to ground 10 whereupon an attitude determination on-ground is made using the ground components 11 and 12. Thereafter, the determined attitude information from ground is transmitted to the on-board segment 2 and this transmitted information is used to initialise a fine attitude estimation on-board and to execute the scanning law algorithm which, in turn, are used to compute the thruster on-times, stop-times and other relevant data for every manoeuvre to be executed. This data is used, in turn, to enable the active nutation damping means 8, permitting closed loop nutation control to be automatically applied at the end of each manoeuvre, if desired. The described operation can be controllably repeated by repeating the steps in closed loop on-board, namely by operating together the attitude determination means 5 and the algorithm means 6 in closed loop, enabling the errors in prior manoeuvres to be corrected.

Figure 5:
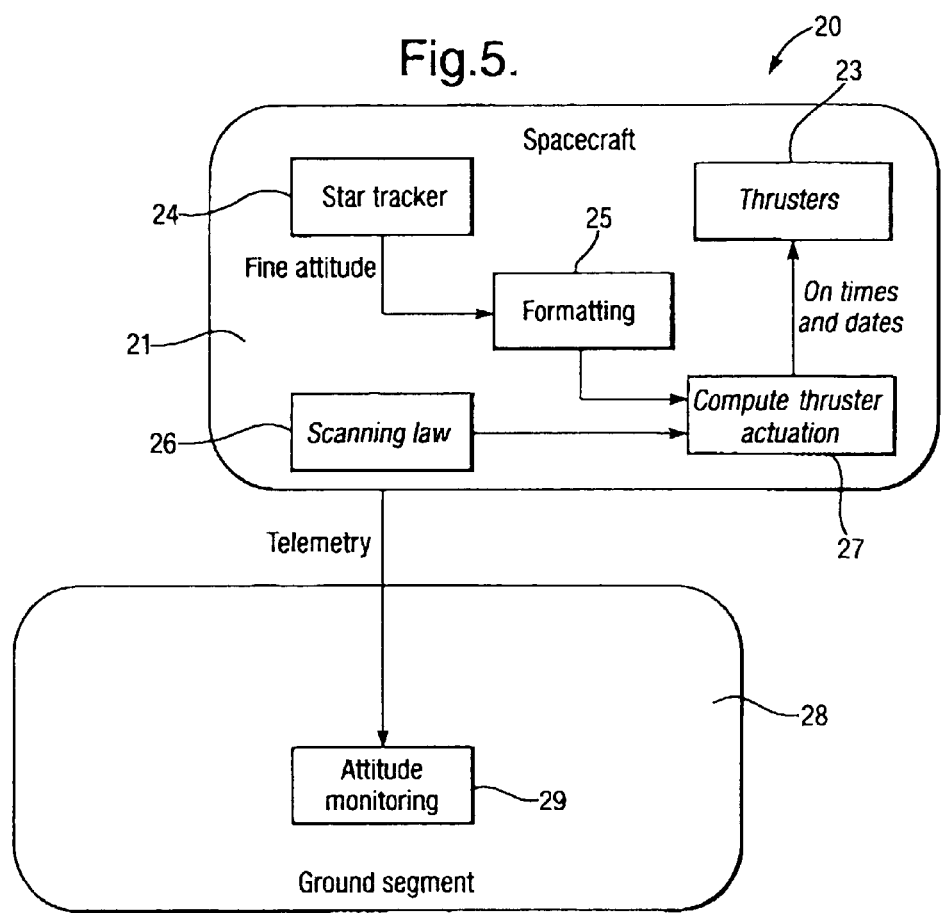
FIG. 5 is a schematic of an arrangement incorporating a star tracker embodying the present invention.

Referring to FIG. 5, there is schematically shown therein another preferred spacecraft system 20 adapted and arranged to carry out the closed loop nutation avoidance manoeuvre (NAM) of the present invention. As shown in the Figure, the spacecraft system 20 comprises an on-board segment 21 which includes a plurality of thrusters 23 arranged in a predetermined spatial configuration (not shown) at the spacecraft, a star tracker component 24, means 25 for formatting data and performing a fine attitude determination on-board in closed loop, scanning law algorithm means 26 and computation means 27 for computing the NAM manoeuvres and executing the manoeuvres closed loop to target the required spacecraft angular momentum orientation in inertial space. As shown, the on-board segment 21 is arranged to co-operate with a remote ground segment 28 by telemetry. The ground segment 28 comprises attitude monitoring equipment 29.

Advantageously, the star tracker component 24 is an autonomous tracker insofar as the attitude estimation process is completely handled by the tracker, requiring minimal or no interfaces with the AOCMS. In this embodiment, the star tracker component 24 comprises new generation units using an embedded star catalogue coupled with acquisition and tracking algorithms, and the tracker is conveniently designed to send attitude data to ground 28 at any particular requested time.

In operation of the system 20, the on-board star tracker 24 transmits data to the formatting means 25 and this transmitted data is appropriately formatted and used to initialise a fine attitude estimation on-board and to execute the scanning law algorithm 26 which in, turn, are used to compute the thruster on-times, stop-times and other relevant data for every manoeuvre to be executed. The described operation can be controllably repeated by repeating the above described steps in closed loop on-board, and conveniently, the attitude data on-board can be controllably transmitted to ground attitude monitoring means 29 at particular requested times, if desired. In this way, the acquisition of knowledge of the current attitude on-board provides the means to reduce/avoid accumulation of re-orientation manoeuvre errors, any manoeuvre being able to correct for the previous computed manoeuvre realisation error.

Conveniently, the arrangement of FIG. 5 using autonomous star tracker means can be envisaged for use in low spinning spacecraft missions (typically, for low spin rates below 1 rpm).

Figure 6:
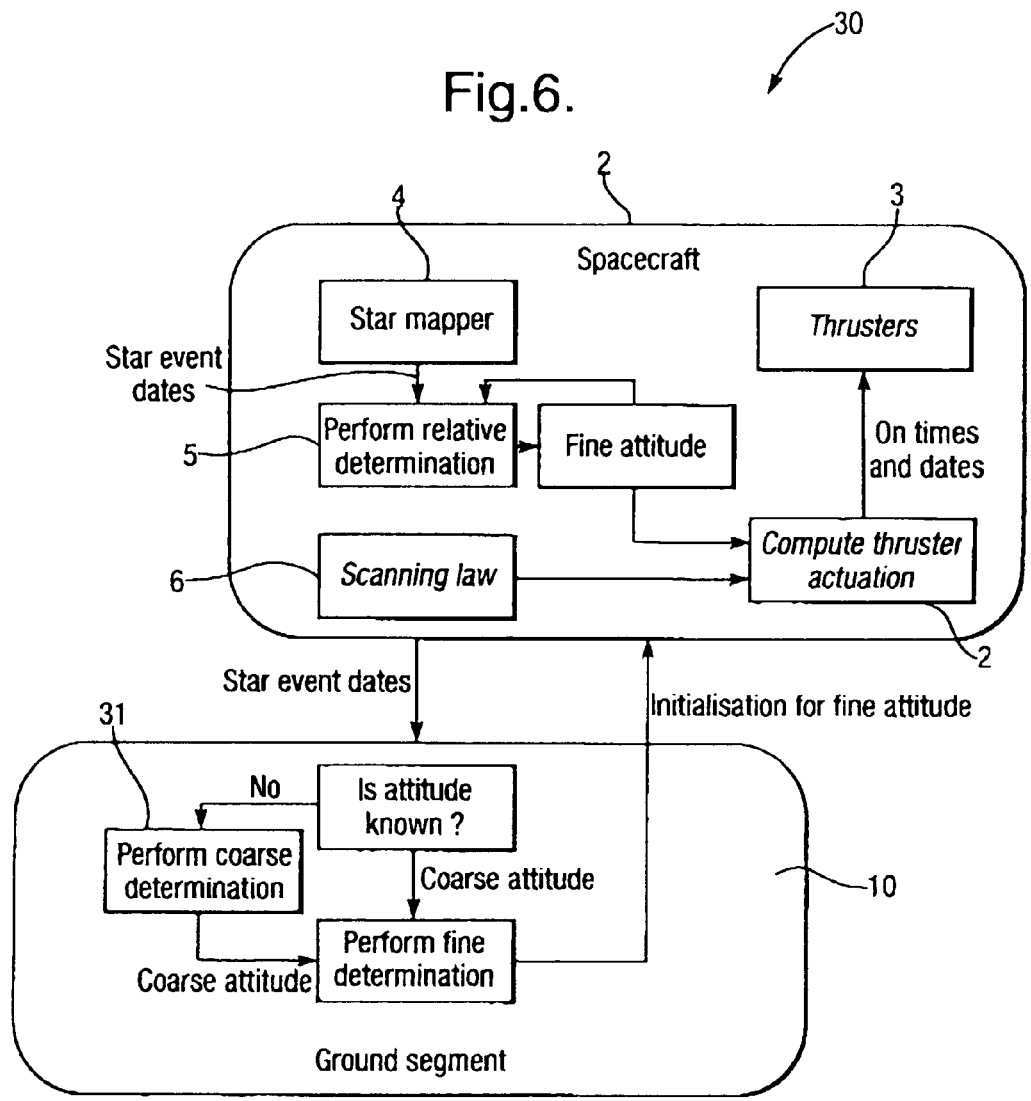
FIG. 6 is a schematic of an arrangement incorporating a star mapper embodying the present invention.

Referring to FIG. 6, there is schematically shown therein another spacecraft system 30 incorporating a non-autonomous star mapper embodying the present invention. The arrangement shown in the Figure is almost identical to the previously described FIG. 4 arrangement and only the essential differences between these two Figures will be described hereinbelow. For sake of clarity, FIG. 6 employs the same reference numerals as are employed in FIG. 4 for same/like parts of the spacecraft system.

As shown in FIG. 6, the on-board attitude determination is defined, at its simplest level, as the autonomous restitution of a fine attitude from well predicted attitude information after a re-orientation manoeuvre. The activity is performed during periods in between re-orientation manoeuvres. The on-board attitude knowledge is propagated through star mapper measurement during the re-orientation manoeuvres. This is achieved by using a non-autonomous star mapper 4 such as a V-slit star mapper. Alternatively, this could be achieved through gyroscope measurement (not shown). Note that in this arrangement, as shown, the absolute attitude determination stands as a ground activity 10, but is envisaged to be limited to an initial attitude determination 31 with possibly large errors and to regular checking of the quality of the relative attitude determination performed on-board (i.e. verification of no drift). Note that no active nutation damping is shown to be provided on-board in this embodiment (unlike in the FIG. 4 embodiment).

It is to be appreciated that the simple proposed solution is not limitative and can be extended to full autonomous attitude determination on-board.

Conveniently, the arrangement of FIG. 6 using a non-autonomous star mapper 4 can be used for high spin rates (typically up to 20 rpm). Conveniently, the acquisition of knowledge of the current attitude on-board provides the means to reduce/avoid accumulation of re-orientation manoeuvre errors, any manoeuvre being able to correct for the previous computed manoeuvre realisation error.

Re-Orientation Manoeuvres and Nutation Control

The spin axis scan strategy employed in the invention is an improvement over the known Nutation Avoidance Manoeuvres developed for passive spinning satellites. The use of high accuracy gyroscopes, for example, obviates the need to tightly control the inertia ratio throughout the mission life, provides the most efficient manoeuvre, and allows the manoeuvre to be completed in a very short time.

The Spin axis scan law is computed relative to the inertial attitude, and is uploaded regularly, upon ground request, to the AOCMS. This scan law is a mathematical law describing the required motion of the spin axis over the required autonomy period. The AOCMS software computes the required attitude manoeuvres on board according to the prescribed attitude and the actual attitude: amplitude and phase of spin axis tilt. The phase of spin axis tilt is converted into the spacecraft time at which to start the manoeuvre, as derived from the spacecraft thruster configuration.

A more generic strategy than known Nutation Avoidance Manoeuvre is proposed in the invention using gyroscopes to complete the manoeuvre. In an embodiment of the invention using two thrusters, the magnitude of the first of two thruster actuations is calculated based on the thruster torque level. This provides a change of momentum vector that is in the correct direction but is half of the magnitude required. The first opportunity to complete the manoeuvre is half way through the precession cycle of the spin axis in inertial space. It is possible to complete the manoeuvre at a time from the start of the manoeuvre given by t=n+0.5) P where P is in the inertial nutation period and n is any positive integer or zero. This is shown in FIG. 7.

Figure 7:
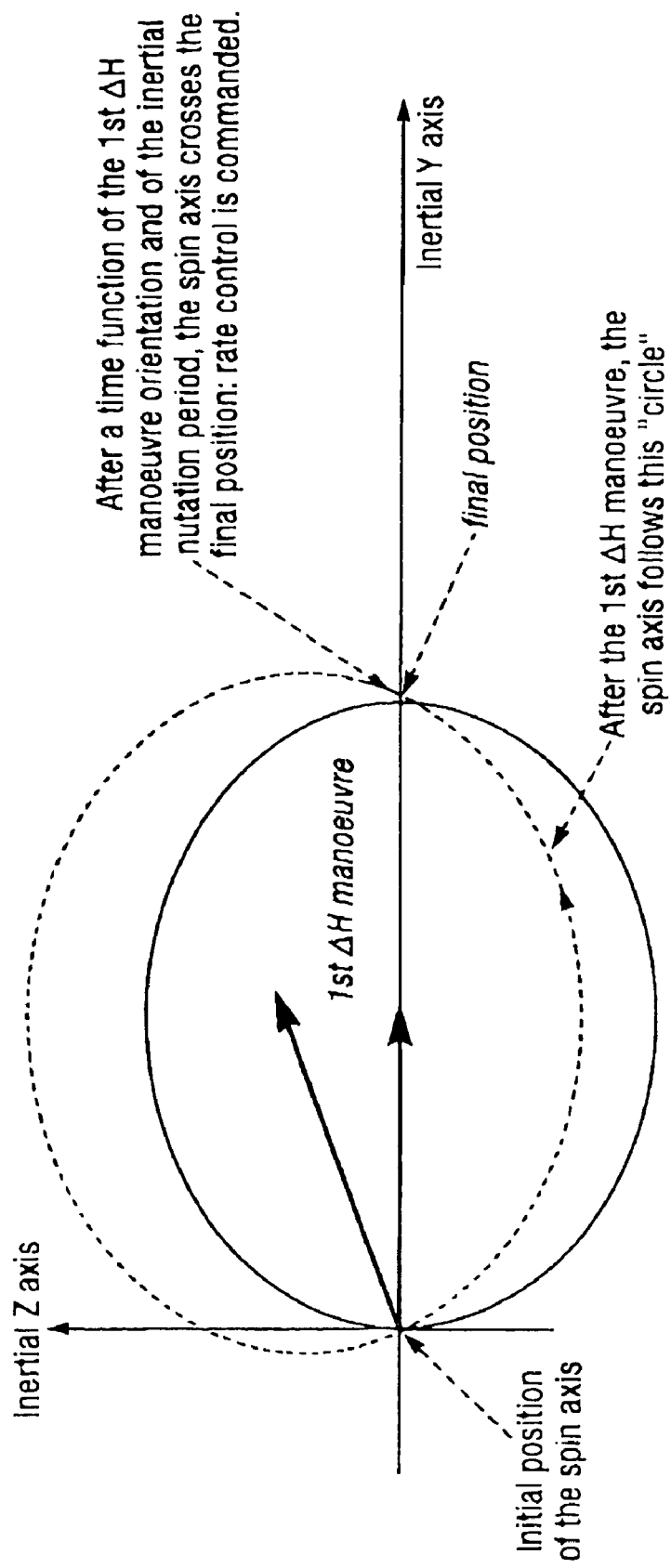
FIG. 7 is a diagram for the inventive closed loop nutation avoidance manoeuvre of the present invention.

The manoeuvre is then completed at the predetermined time by enabling rate controller means at the spacecraft, which controller means is in charge of stopping the precession of the spin axis and cancelling the nutation, as illustrated in FIG. 7. The nutation magnitude θ is estimated from the transverse rates measured by the gyroscopes using the following relationship:

$$\omega_{pitch/yaw} = \frac{I_{spin} \cdot \omega_{spin} \cdot \tan\theta}{I_{pitch/yaw}}$$

The rate controller means calculates the required thruster-on times to remove the transverse angular rates measured by the gyroscopes.

Figure 8:
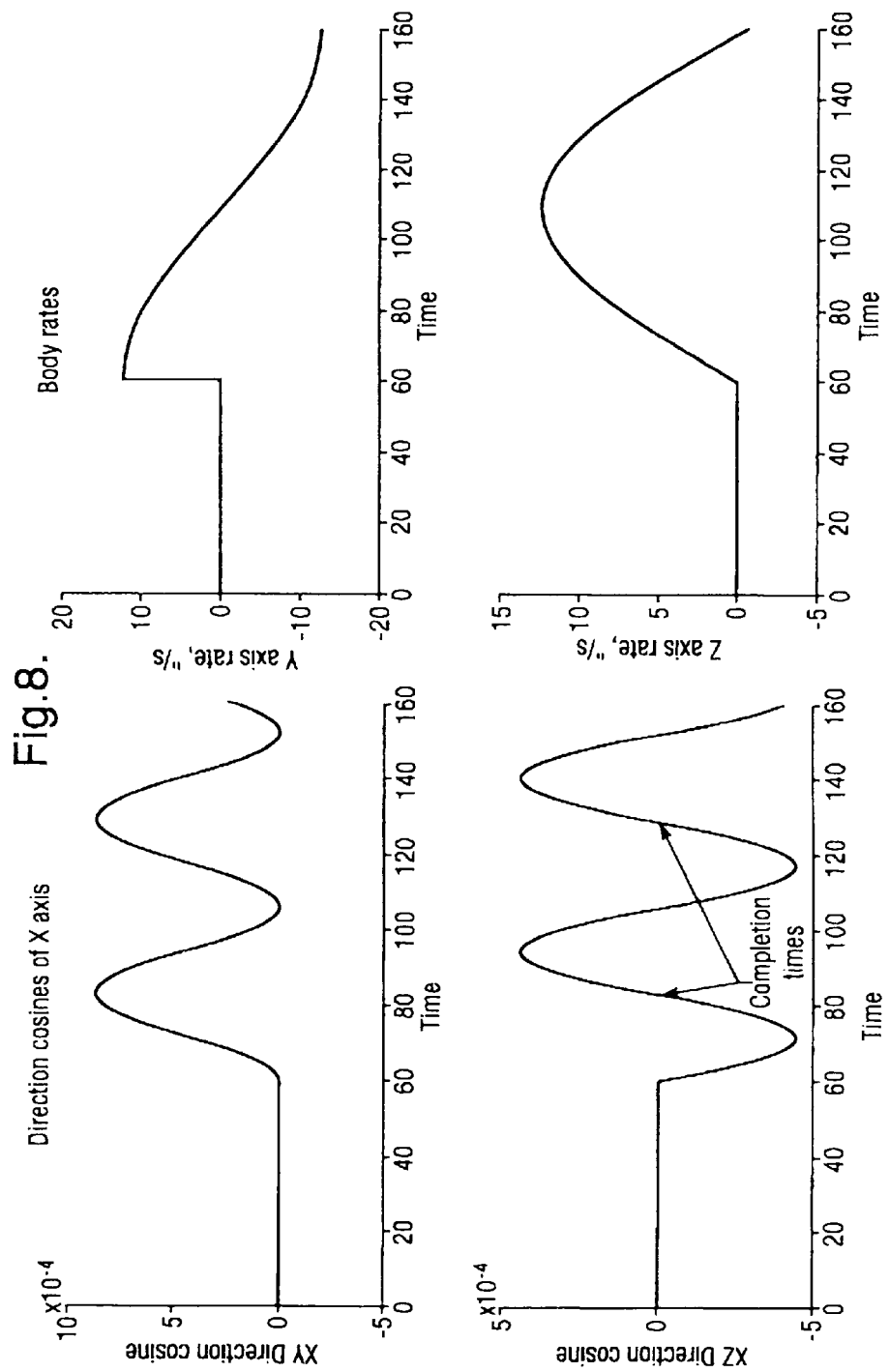
FIG. 8 shows example simulations for closed loop manoeuvre(s) of the present invention.

The adapted strategy in the invention bears the advantage that the inertia ratio does not need to be confined to specific regions. The manoeuvre can always be executed and the nutation minimised whatever the inertia ratio. An example of typical simulation results is given in FIG. 8.

Figure 9:
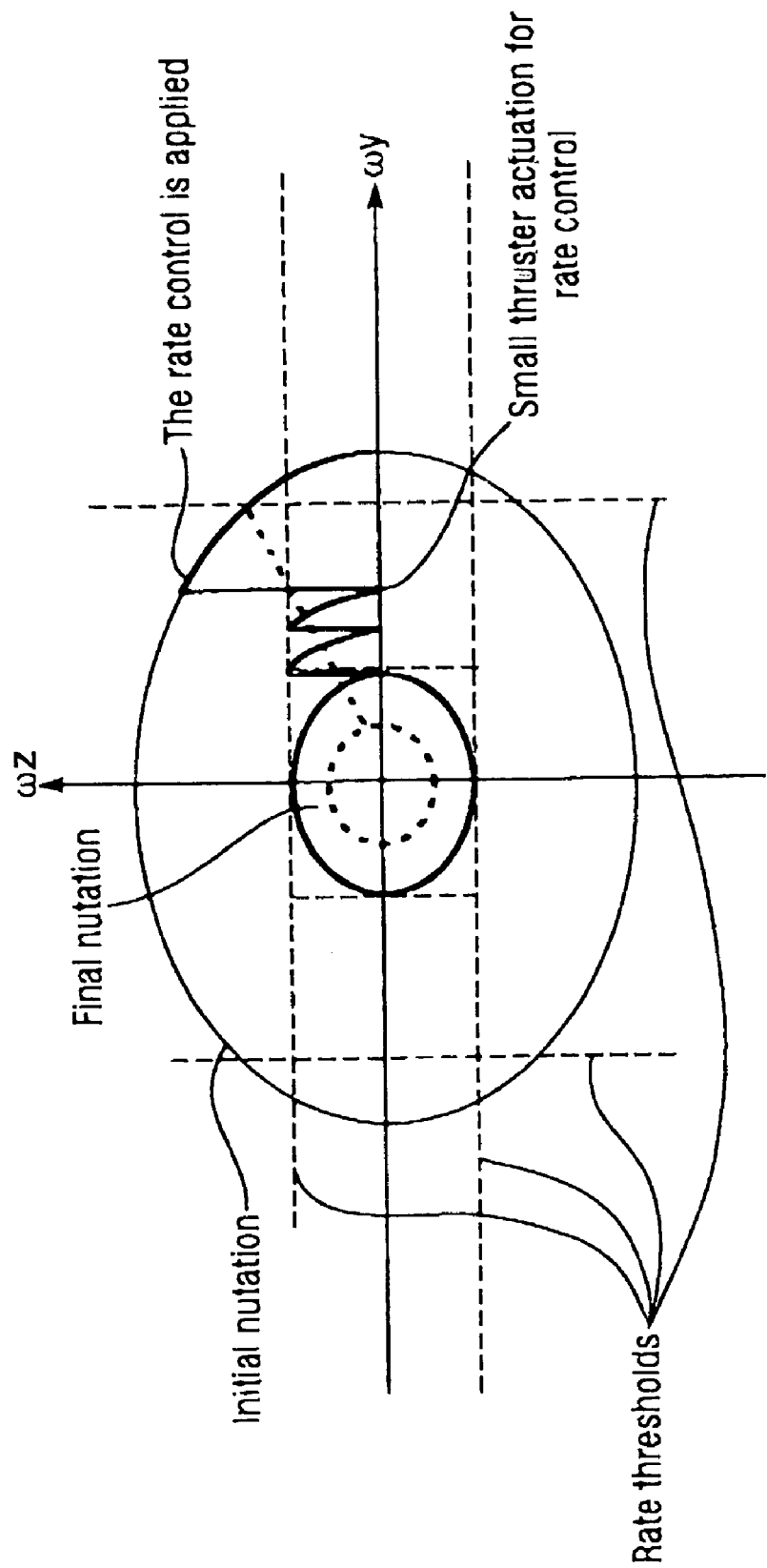
FIG. 9 is a diagram showing how the spacecraft nutation is cancelled using thruster actuation in the present invention.

Note that a small tilt of the manoeuvre can also be advantageously commanded to reduce/minimise the manoeuvre duration. Indeed, this involves a larger nutation (dotted circle in FIG. 7), allowing the transverse rates to reach the threshold more quickly, and to cancel the nutation in a single thruster actuation (dotted lines in FIG. 9). The price associated with this faster strategy is a degradation of the manoeuvre efficiency as the cosine of the tilt angle (a).

It is to be appreciated that the accuracy of a re-orientation manoeuvre depends on the knowledge of the inertia ratios and on the thruster errors, and the transverse rate thresholds are sized from the following values:

$$\delta\omega_y = \frac{T_y \cdot (\lambda_y - 1) \cdot T_{on}}{(I_{xx} - I_{yy})} \quad \delta\omega_z = \frac{T_z \cdot (\lambda_y - 1) \cdot T_{on}}{(I_{xx} - I_{zz})}$$

where $T_y$, $T_z$ are the thruster pitch and yaw torques, $\lambda_y$, $\lambda_z$ are the inertia ratios, and Ton is the minimum on-time of the thrusters.

Technical Result of the Invention

Attitude Estimation

As covering the widest range of spin rate considering existing attitude sensors, the concept of an autonomous AOCMS attitude estimation on a spinning satellite has been prototyped with a non-autonomous star mapper. This attitude estimation solution is only illustrative, with the objective to demonstrate feasibility, even using non-autonomous sensing units. This solution appears as a simple candidate solution with existing hardware, and can be further enhanced though hybridising star mapper attitude data with, for example, three-axis gyrometer measurement data. It can also be traded-off with the direct usage of an autonomous star tracker, for low spin rate missions.

Figure 10:
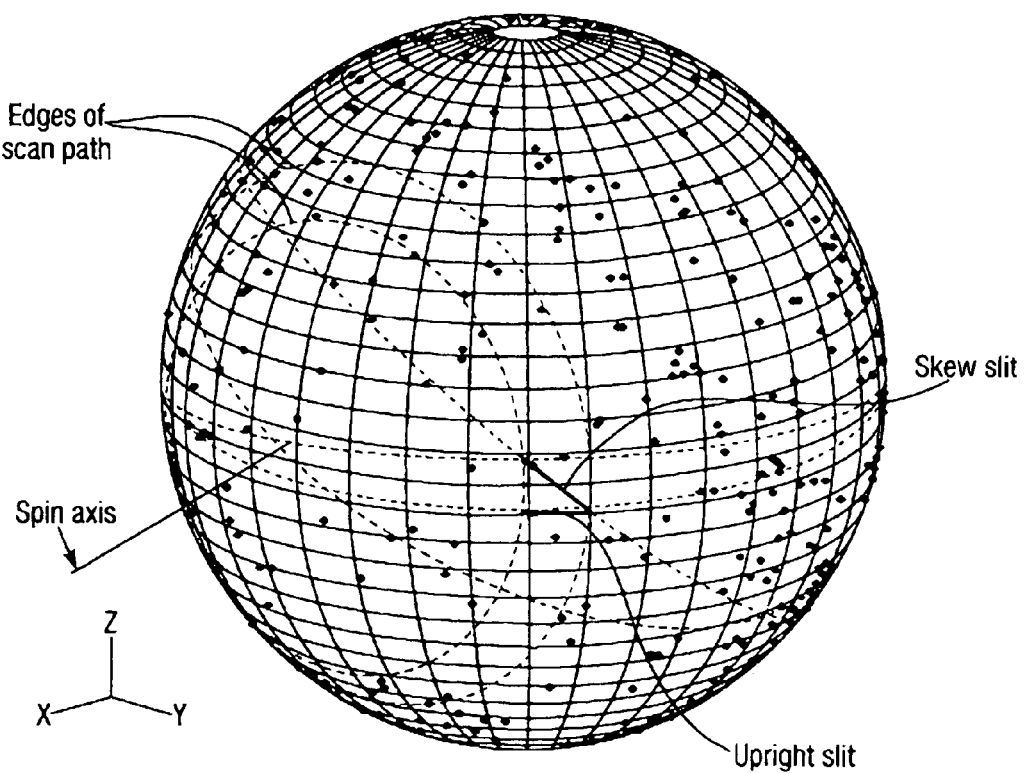
FIG. 10 shows a typical star mapper scan path using the arrangement of FIG. 6.

In the FIGS. 4 and 6 embodiments of the invention, as shown and previously described, a star mapper such as the one used for Giotto and Cluster missions is used. This unit is preferably of the "V" slit type, with its optic axis orthogonal or canted with respect to the spin axis. As the spacecraft rotates, the field of view of the sensor scans an annular region of the sky, bounded (in the simplest case) by two circles centred on the spin axis. This is shown on FIG. 10 (the X-axis is considered as the spin axis as a convention). The star mapper outputs a series of event timings for stars crossing each of the slits. Stars near the detection threshold may be registered unpredictably, and some false events may contaminate the raw data. It is the task of the on board software to process the raw event timings to generate an accurate estimate of the spin axis attitude. This level of autonomy advantageously replaces an activity traditionally done by ground. As a by-product, a highly accurate estimate for the spin rate is generated from the star mapper data.

Figure 11:
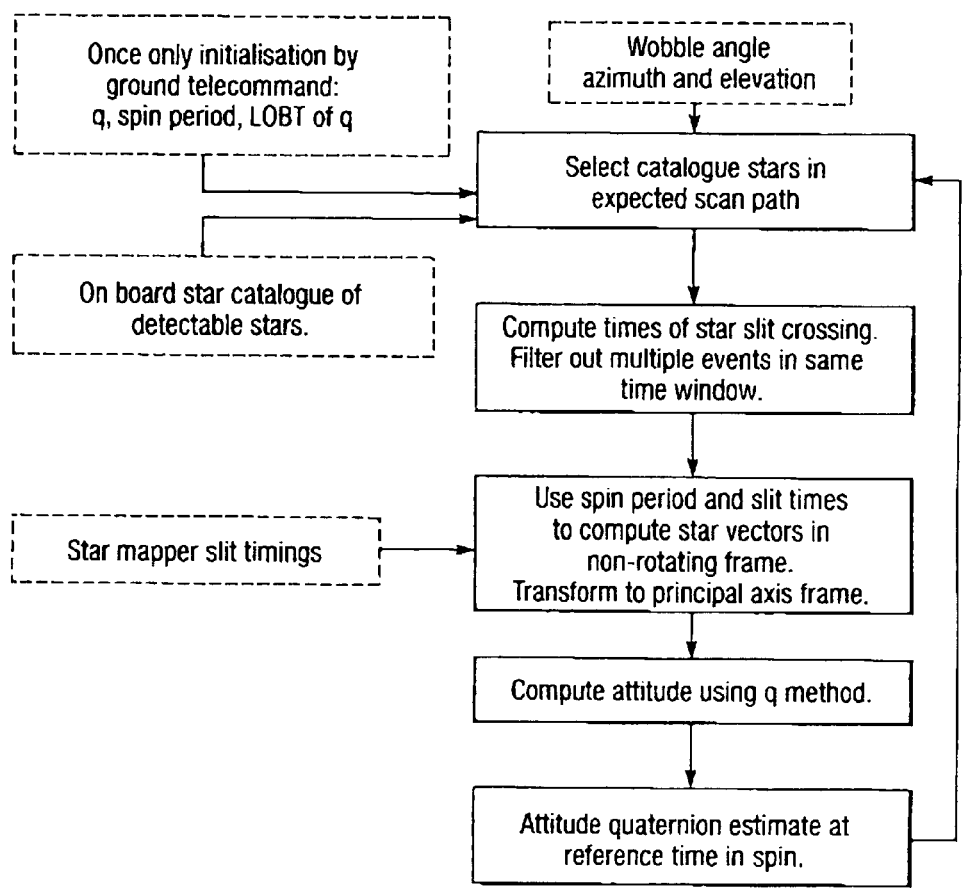
FIG. 11 is a flow chart of the steps carried out by the arrangement of FIG. 4 to determine the spacecraft attitude on-board.

In the FIGS. 4 and 6 embodiments of the invention, the attitude determination technique relies on ground telecommand data for an initial attitude estimate, but then self-propagates without any further intervention. The attitude estimated on-ground is performed in a way identical to that for Cluster, and the resulting quaternion up-linked to the spacecraft. Periodic re-initialisations are performed to counter any long-term drift effects. This level of autonomy avoids the need for on-board star pattern recognition. The initialisation specifies the full attitude state (angles and rates) at a certain point in the spin motion. An initial spin rate estimate is also required, either from gyro data or ground command. The algorithm uses the on-board catalogue to predict the event timings for both star mapper slits, using the attitude estimate and a "priori" knowledge of the spacecraft 'wobble' angles (defining the alignment of the main inertia axes in spacecraft reference frame). Time windows are defined around the predicted event times. Filtering is applied to remove events not sufficiently separated in time to safely prevent false star identification (the filtering result is attitude-dependent, and so the catalogue cannot be pre-filtered for this criterion). The widths of the applied time windows are chosen such that the uncertainty on wobble angles knowledge, or a residual (small) nutation does not prevent from correct star identification. The remaining well-separated events define an unambiguous association of a subset of star mapper event times with known stars. Mapper times which lie far from the predicted slit crossing times are rejected, as being due to false events or genuine but non-stellar objects (e.g. bright planets). Mapper events are retained if the time windows for both slits contain only one event time. Genuine events for faint stars which register in only one slit are thus rejected. A flowchart for the algorithm, as applied to the on-board segment of FIG. 4 for fine attitude computation, is shown in FIG. 11. Typical expected and measured event times over 6 spin periods are further shown in FIG. 12. More particularly, as shown in the Figure, the star mapper outputs a series of event pulses for each slit. Good stars are stars with well-separated event times which avoid possible misidentifications. This filtering means that some of the observed mapper times are rejected, those present in the lower plot but not in the top one. Note that mapper calibration data for the delay time bias as a function of star magnitude is advantageously used to provide time corrections based on catalogued star magnitude.

For each predicted event where both slits register the star the exact timings and spin rate are used to construct a star vector in a principal axis based non-rotating frame. Multiple stars are used to generate an attitude quaternion estimate using the so-called "q method".

The on-board star catalogue is conveniently built using standard techniques taking into account the characteristics of the considered sensing unit. As an example, for the Giotto/Cluster star mapper unit, due to the low sensitivity of the star mapper, only the brightest stars (estimated to 600) are required to give complete coverage to the detection limit.

Monte Carlo simulation results using a prototype algorithm for use in the invention are also shown by way of example in FIGS. 13 and 14. This includes nutation and a simple delay time model, but excludes several effects such as disturbance torques and natural nutation damping. The solution error is typically less than 0.3' in each axis at 1σ (one standard deviation). Note, in this connection, that FIG. 13 shows the typical results obtained from solving for the attitude in 4000 cases with random uniformly distributed spin axes, using 2 revolutions of data. The same initial body rates are used for each case, with a nutation angle of 30". The null error is due to the (uncompensated) delay time, whilst the nutation angle maps onto pitch. Note also that the FIG. 14 plot shows the number of stars matched to the on-board catalogue. In this case, the minimum number is 4, which occurred in overcrowded regions of the sky, where detectable stars were rejected as being too close together for reliable identification. The mean and median number of matches here is 13 and a minimum of 2 stars is required.

Autonomous Spin Axis Re-Orientation

The new spin re-orientation manoeuvre strategy of the invention presented hereinabove has been applied to the realisation of an autonomous sequence of scan manoeuvres illustrated in FIG. 15. The principle is to send to the spacecraft the guidance profile, i.e. the specification of the successive orientations of the spin axis relative to an inertial frame over the next autonomy period. The re-orientation manoeuvres are then performed autonomously to minimise the spin axis pointing error accumulation.

As shown in FIG. 15, the scan sequence to be realised over the following autonomy period is specified as a time-line of reorientation manoeuvres and the requested change in spin axis orientation relative to the reference inertial frame. The exact manoeuvre and rate control enabling times are then autonomously computed on-board according to the residual nutation resulting from the previous manoeuvres.

Note that the time of the pulse is computed according to the current attitude, which relates to a reference time, and the required direction of motion of the spin axis, which equates to a delta time. To complete the manoeuvre, a second delta time is computed which is n+0.5 times the inertial nutation period. The value of n is either 1 or 0, depending on the inertia properties and the required efficiency of the manoeuvre. At this time after the initial impulse, the gyros are used to calculate the thruster actuations required to null the nutation rates on both the Y and Z-axes (X-axis is here defined as the spin axis).

Figure 16:
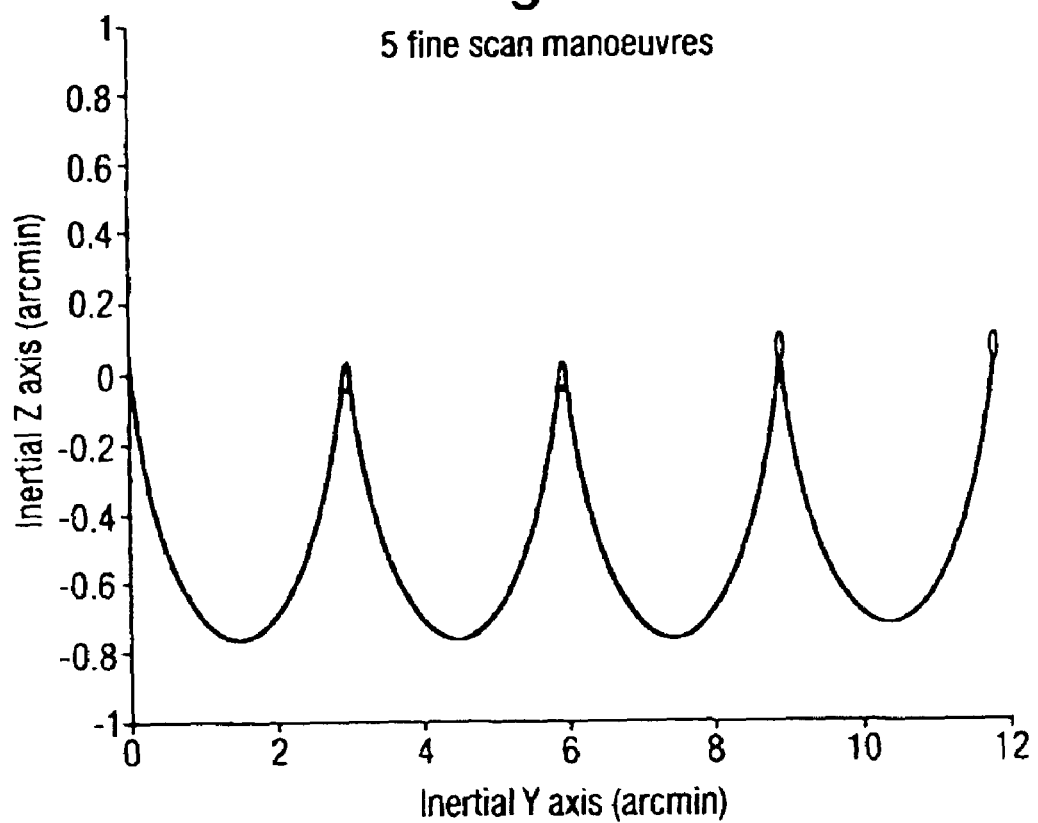

FIG. 16 shows a sequence of five spin axis re-orientation manoeuvres in an inertial reference frame to which the present invention can be applied. The plot shows the path of the spacecraft X-axis (spin axis) projected into the inertial YZ plane, which is coincident with the spacecraft YZ plane at zero time. The time between the initial and final thruster actuation for each manoeuvre is half of the inertial precession period (the spin axis follows an half ellipse), i.e. between 20 and 30 seconds in the studied case. The residual nutation at the end of the sequence is in the order of 0.1 arcminutes, as is the error in the manoeuvre itself. The dispersion on the final orientation of the spin is due to the random walk error resulting from gyro measurement errors, the thrusters errors, and uncertainty on the centre of mass. In this connection, it is to be noted that the accuracy of the scan manoeuvre is typically better than 0.4' and that the accumulation of error is effectively reduced/eliminated by a forward correction strategy. The nutation is managed/regulated as part of the manoeuvre strategy, ensuring that the pointing stability of the spacecraft is achieved in a minimum time after the beginning of the manoeuvre.

An error on the inertia ratios knowledge results in errors on the phasing between the first manoeuvre and the rate control application. In fact, the inertial nutation period will not be correctly estimated, and the rate control will be commanded either too earlier or too later than required. This error, if not corrected, creates an apparent drift of the spin axis in the inertial frame:

The error on the knowledge of the inertia ratio results in an error after one manoeuvre of:

$$\delta = \frac{\delta_{manoeuvre} \cdot (\pi - 2\alpha) \cdot \Delta\lambda}{2 \cdot \cos\alpha}$$

where: $\delta_{manoeuvre}$ is the amplitude of the manoeuvre, $\alpha$ is the tilt of the manoeuvre relative to a nominal direction, and $\Delta\lambda$ is the error on the inertia ratio.

Figure 17:
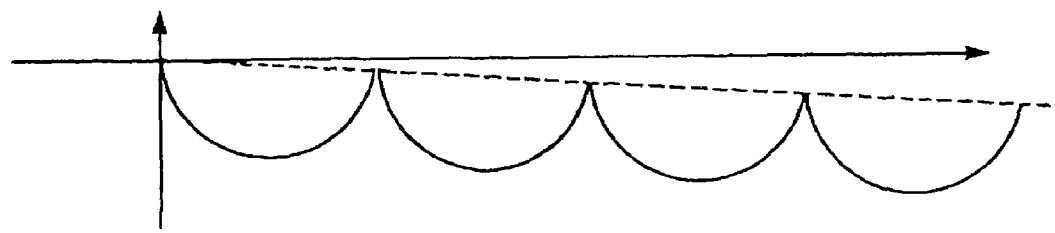
FIG. 17 shows the drift of the spacecraft spin axis typically arising from manoeuvring prior to its correction in the invention.

This drift of the spin axis is typically illustrated in FIG. 17 and as previously described the attitude information which is derived in the invention provides effective means for compensating for such manoeuvre realisation errors using a forward correction strategy.

Having thus described the present invention by reference to several preferred embodiments, it is to be appreciated that the embodiments are in all respects exemplary and that modifications and variations are possible without departure from the spirit and scope of the invention. For example, whilst in the described embodiments two or four thrusters are preferably deployed, the accuracy and efficiency of the manoeuvres in the embodiments could possibly be improved, if desired, by provision of additional thrusters at the spacecraft. Further, it is to be appreciated that the fine attitude reorientation manoeuvring of the spacecraft could even be effected in a time duration marginally more than half the inertial precession period of the spacecraft about its spin axis if desired, but that this would be at the cost of not completing the spacecraft manoeuvre in the shortest possible time. Further, whilst in the described embodiments the fine attitude determination is performed on-board the spacecraft using a autonomous star tracker or a non-autonomous star mapper, it is equally possible to initialise and/or to perform the fine attitude determination using alternative sensors on-board the spacecraft, for example by using a sun sensor and suitable ephemerous on-board the spacecraft.

It is to be appreciated that the detailed definition of the algorithm means used on-board for attitude determination in the described embodiments is dependent on the actual choice of attitude sensor to be used which will be mission dependent.

It is also to be appreciated that the present invention finds utility in various space missions including low spinning missions (typically below 1 rpm) and higher spin rate missions (typically up to 20 rpm) for spacecraft.

The invention claimed is:

1. An autonomous active manoeuvring method for performing autonomously, in closed loop on-board, a series of fine attitude manoeuvres for a spinning spacecraft, the method comprising:
   (a) arranging a plurality of thrusters in a predetermined spatial configuration at the spacecraft;
   (b) controllably generating a series of thruster pulses by means of the thrusters in said predetermined spatial configuration, the magnitude and the phase of the thruster pulses being determined by computation means so as to permit fine attitude reorientation manoeuvring of the spacecraft about its spin axis, the manoeuvring being effected in a time duration less than or equal to half an inertial precession period of the spacecraft about its spin axis;
   (c) completing the manoeuvring in dependence upon the measured time from the start of the manoeuvre and the measured angular rates associated with the spacecraft nutation; and
   (d) providing an autonomous attitude determination of the spacecraft between successive manoeuvring steps such that, in operation of the spacecraft, any errors associated with particular manoeuvres can be controllably corrected in subsequent manoeuvres.

2. A method as claimed in claim 1, further comprising enabling rate controller means on-board the spacecraft during the manoeuvring at a predetermined time from the start of the manoeuvre such as to actively control the measured angular rates associated with said spacecraft nutation.

3. A method as claimed in claim 1, wherein said series of thruster pulses are time-phased in a manner which takes account of variations in the measured angular rates associated with said spacecraft nutation, enabling said measured angular rates to be actively controlled.

4. A method as claimed in claim 1 wherein the angular rates are measured by gyroscopic means and the thruster torques are applied on two predetermined transverse axes of the spacecraft, the transverse axes being defined as orthogonal to the spin axis of the spacecraft.

5. A method as claimed in claim 1 further comprising enabling autonomous star tracker means on-board the spacecraft, which tracker means is arranged to co-operate with the computation means, providing an autonomous attitude determination of the spacecraft between manoeuvres and establishing the error of prior manoeuvres.

6. A method as claimed in claim 1 further comprising enabling a non-autonomous star mapper means on-board the spacecraft, which mapper means is arranged to co-operate with the computation means providing an autonomous attitude determination of the spacecraft between manoeuvres.

7. A method as claimed in claim 6, further comprising providing a coarse attitude determination on-ground and performing a fine attitude determination on-board the spacecraft based upon a comparison of the attitude information on-board and the attitude information from ground.

8. A method as claimed in claim 7, wherein the fine attitude determination on-board is effected upon being initialised by an attitude determination on-ground.

9. A spacecraft system adapted and arranged to carry out a method as claimed in claim 1.

10. A system as claimed in claim 9 comprising:
   a plurality of thrusters arranged in a predetermined spatial configuration at the spacecraft, the thrusters being operable to generate controllably a series of thruster pulses;
   means for determining the magnitude and the phase of the thruster pulses so as to permit fine attitude reorientation manoeuvring of the spacecraft about its spin axis, the manoeuvring being effected in a time duration less than or equal to half an inertial precession period of the spacecraft about its spin axis;
   means for completing the manoeuvring in dependence upon the measured time from the start of the manoeuvre and the measured angular rates associated with the spacecraft nutation; and means for providing an autonomous attitude determination of the spacecraft between successive manoeuvring steps such that, in operation of the spacecraft, the errors associated with particular manoeuvres can be controllably corrected in subsequent manoeuvres.

11. A computer program which when loaded into a computer will enable it to operate in a system as claimed in claim 10.

* * * * *